United States Patent [19]

Stodola

[11] 4,328,583
[45] May 4, 1982

[54] DATA BUS FAULT DETECTOR

[75] Inventor: Kevin C. Stodola, Cedar Rapids, Iowa

[73] Assignee: Rockwell International Corporation, El Segundo, Calif.

[21] Appl. No.: 185,118

[22] Filed: Sep. 8, 1980

[51] Int. Cl.³ .................................................. G06F 11/00
[52] U.S. Cl. ........................................... 371/57; 371/3; 371/63
[58] Field of Search .................... 371/57, 62, 63, 3; 375/19

[56] References Cited

U.S. PATENT DOCUMENTS

| | | | |
|---|---|---|---|
| 3,530,284 | 9/1970 | Wood | 371/60 |
| 4,088,876 | 5/1978 | Rege | 371/57 |

*Primary Examiner*—Charles E. Atkinson
*Attorney, Agent, or Firm*—V. Lawrence Sewell; Howard R. Greenberg; H. Fredrick Hamann

[57] ABSTRACT

An error detection circuit detects prolonged sequences of unchanged logic state in a data busing structure. The circuit generates a complementary two rail logic output from a pair of flip-flops. The circuit includes a comparator which compares the logic state of the data input from the bus with the output of one of the flip-flops, and which inputs alternate opposite logic states to that flip-flop as long as the data input exists for a time in the same logic state as the output of the one flip-flop during a cycle. The complementary two rail output changes every cycle to actively exercise the error detection circuit and prevent silent failures therein. The circuit is self-checking because internal failures yield non-complementary outputs.

19 Claims, 5 Drawing Figures

4,328,583

DATA BUS FAULT DETECTOR

TECHNICAL FIELD

The invention relates to circuitry for detecting failures in data busing structures, particularly prolonged sequences of one logic state without intervening bits of opposite logic state.

BACKGROUND

A data busing structure is employed for transmission of data between elements of a system. Typically, both the data and a clock or strobe for delimiting data bits are bussed in the system. In many systems, the data bus is further defined such that the data bus logic state must change at least once in a certain length of time (or number of bits). A failure to change in the specified period is an indication of a failure in the system. These prolonged sequences of one logic state or the other typically occur if the data source fails or becomes inactive or if the data bus driving circuit or bus itself fails.

A need has arisen for a simple and efficient circuit for detecting the above noted prolonged sequences of unchanged logic state. There is further a need for an error detector circuit of this character which indicates an error in the case of internal failures within the detector circuit itself, whereby to afford a self-checking circuit. There is still a further need for a circuit of this character which is actively exercised in the absence of an error so that a fault occurring within such circuitry will become readily apparent at an early stage in order to guard against silent failures.

SUMMARY

The circuit of the present invention provides an error detector circuit for checking a data bus. The types of failures detected by the circuit are prolonged sequences of logic ones or prolonged sequences of logic zeros on the data bus (more than some predetermined number of bits) without intervening bits of opposite logical state.

The error detector circuit of the present invention satisfies the above noted and other needs, and does so in a particularly simple and efficient manner. In addition to a prolonged sequence of unchanged logic state on the bus causing an error indication, a failure within the error detector circuit itself will also produce an error indication, whereby to afford a self-checking circuit. In another desirable aspect of the invention, the output of the detector circuit is made to change at frequent intervals to actively exercise the error detection circuitry so that any fault within such circuitry will become readily apparent at an early stage to prevent silent failures within such circuitry.

The error detector circuit implements in the preferred embodiment a form of two rail logic where the error detector output signals are generated in both true and complement form, on two rails. The signals present on the two rails of the output signal pair should always be complementary. An error is indicated if the two rails of the output signal pair are not complementary. Furthermore, the error detector logic is designed such that a failure within the logic will be transmitted through the following logic such that the error may be detected at the final output of the logic circuit. Thus, any error presented to the detector circuit, or occurring within the circuit, will be indicated at the final output of the circuit.

DETAILED DESCRIPTION

Figure 1:
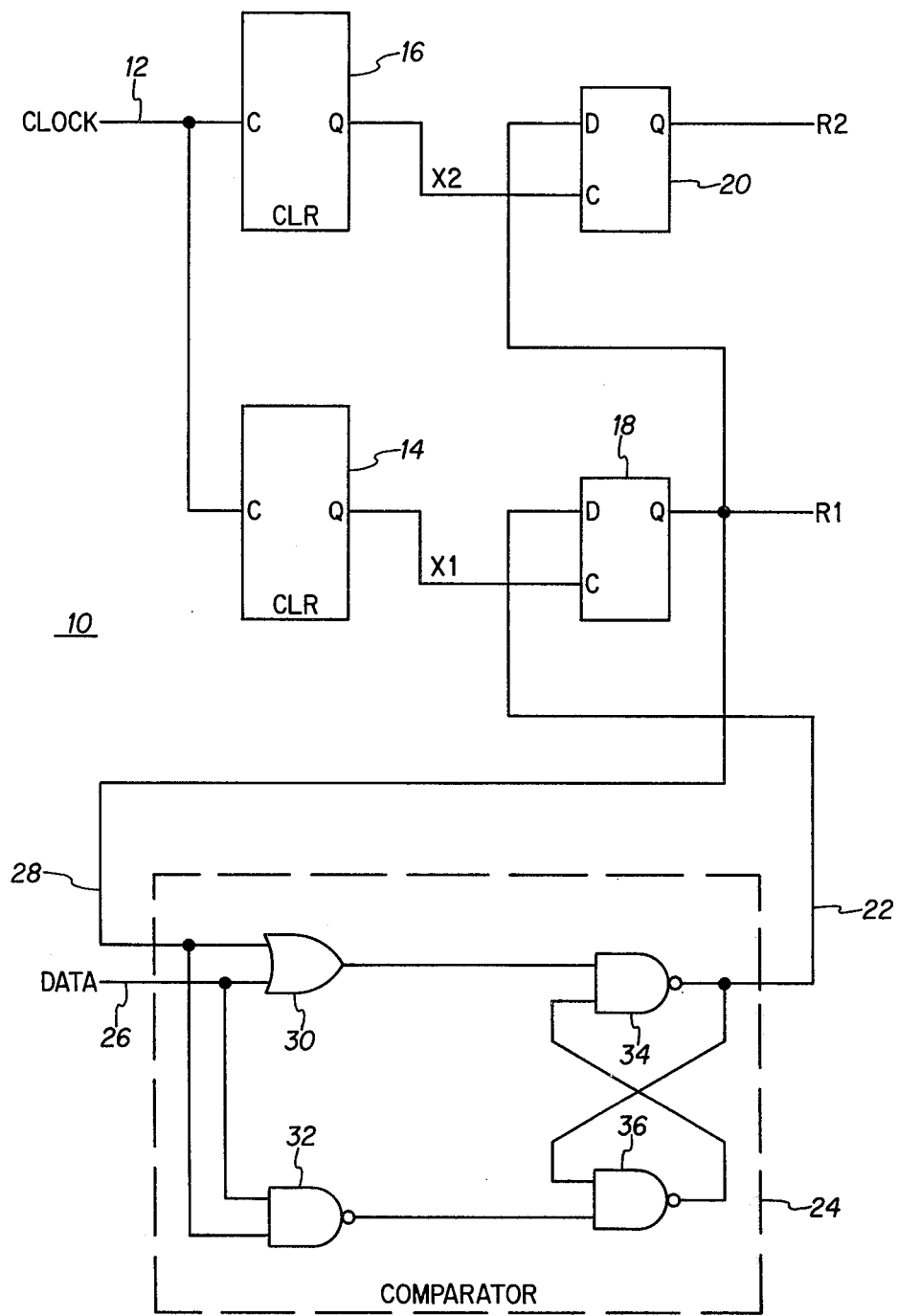
FIG. 1 is a circuit diagram of the preferred embodiment of an error detector circuit constructed in accordance with the invention.

Referring to FIG. 1, an error detector circuit 10 provides a means of checking a data bus for prolonged sequences of logic ones or prolonged sequences of logic zeros. A specified number of bits are checked to see that a logic level change has occurred. The data clock 12 is used to time detection circuit 10 and may be provided to the error detector via a separate clock bus, or may be extracted from the data bus by any of a number of well-known techniques, for example by using a phase locked loop. A failure of this data clock 12 would cause the output of detection circuitry 10 to be either invalid or inactive. Therefore, for greater integrity, the data clock would be checked by some other circuit, for example another phase locked loop, oscillator or dual bus error detector, to insure its validity.

A pair of divide by N dividers or counters 14 and 16 are each clocked by data clock 12 at their clock inputs and generate an output signal at their Q outputs every Nth data time slot. In the particular embodiment of FIG. 1, dividers 14 and 16 divide by 8. These dividers are initialized by a synchronous pulse to their clear (CLR) inputs to synchronize the dividers so that their outputs will occur simultaneously. In operation, the C inputs of dividers 14 and 16 receive a clock pulse for each data bit, and generate the Q outputs once for every N data bits, where $3N-1$ is the number of bits in which a data logic state change must occur, explained more fully hereinafter.

The Q output of the first divider 14 delivers a signal X1 which clocks a first type D flip-flop 18. The Q output of the second divider 16 delivers a signal X2 which clocks a second type D flip-flop 20. The Q output of flip-flop 18 is connected to the data input D of flip-flop 20. The Q outputs of flip-flops 18 and 20 provide the two rails R1 and R2 of a complementary two rail logic output. The data input of flip-flop 18 receives a DET signal from the output 22 of a comparator 24. As long as the DET signal is at opposite logic states on successive pulses X1, then flip-flop 18 will change state on successive pulses X1. Since X2 occurs simultaneously with X1, flip-flop 20 will always be set to the state that flip-flop 18 is switching from. Thus, outputs R1 and R2 will always be complementary.

Comparator 24 compares the logic state of data on the bus being checked to that of the Q output of flip-flop 18 during each cycle of N bits. Comparator 24 has a first input 26 receiving data from the bus and a second input 28 connected to the Q output of flip-flop 18. If the data input 26 goes to or is already at the same logic state as the second input 28 (R1) during a cycle, then the DET signal on output 22 will switch to the opposite state of input 28 (R1). Output 22 (DET) will remain latched in that state, regardless of any subsequent changes of data input 26, until flip-flop 18 changes state in response to the next X1 pulse at which time the cycle starts again. Thus, as long as the data input 26 exists in the same logic state as the second input 28 during comparator cycles (delimited by successive X1 pulses), the comparator output signal DET will be in opposite logic states on successive X1 pulses.

Comparator 24 includes a pair of parallel input gates each receiving both inputs 26 and 28, one gate being an OR gate 30 and the other gate being a NAND gate 32. A pair of cross-connected output NAND gates 34 and 36 each receive the output of the other and the output of a respective one of input gates 30 and 32. The output of NAND gate 34 provides the comparator output 22.

Figure 2:
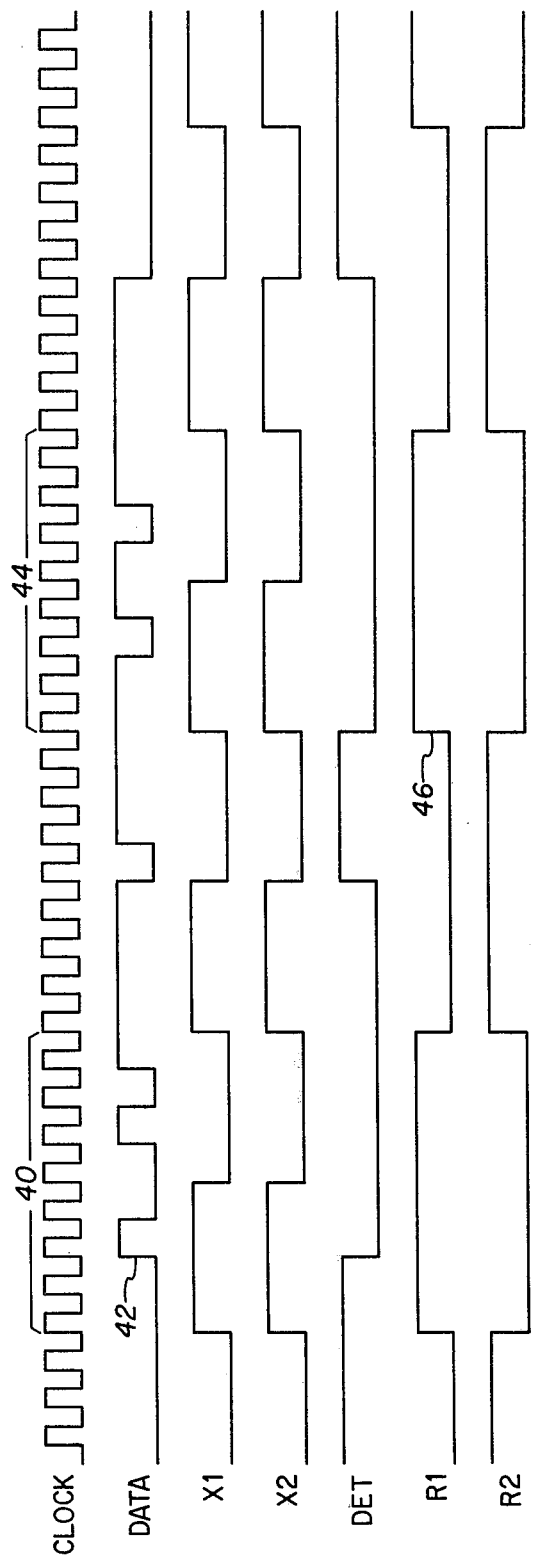
FIG. 2 is a timing diagram showing operation of the circuit of FIG. 1 for valid data.

As seen in FIG. 2, as long as data is input for some time to comparator input 26 in the same logic state as comparator input 28 during every comparator cycle, the comparator output DET signal will be in opposite logic states on successive pulses X1. Output R1 thus switches between alternate opposite states upon each X1 pulse. Output R2 switches to the state from which R1 is leaving. Output R2 will always be in the opposite state of output R1, and the two rails R1 and R2 will be complementary and indicate no error.

Figure 3:
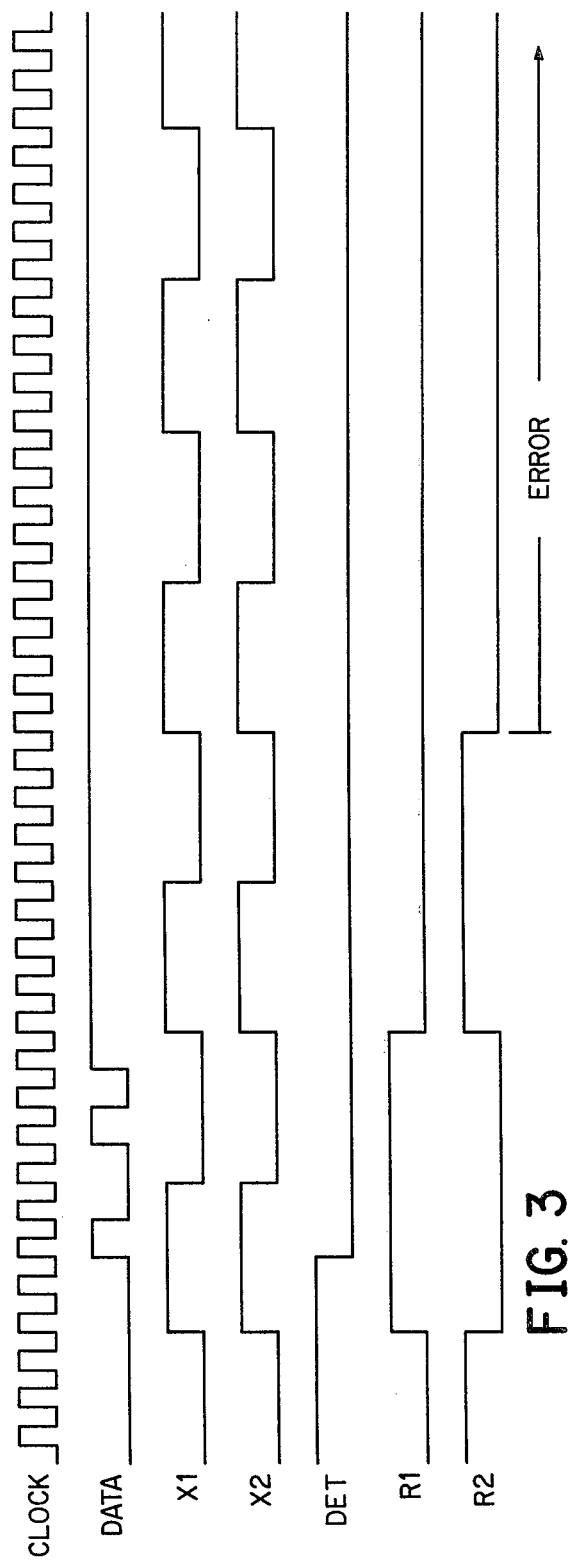
FIG. 3 is a timing diagram showing operation of the circuit of FIG. 1 and includes an error indication.

Referring to FIG. 3, if the data input should fail and therefore remain in the same state, then the comparator output DET signal will fail to toggle and flip-flops 18 and 20 will soon take the same output state. This is a two rail violation, and an error is indicated because R1 and R2 are non-complementary.

Comparator 24 detects a specific logic level on the data input 26. In the implementation shown in FIG. 1, the comparator detects a data logic level equal to the R1 input 28. If data input 26 is already at the logic level to which the R1 input 28 is switching at the beginning of a cycle, the comparator output 22 will change state as soon as R1 switches. If data input 26 is at the opposite logic level to which R1 input 28 is switching at the beginning of a cycle, then the comparator output 22 does not change state until the data input 26 switches.

As illustrated in the first cycle shown in FIG. 2, designated 40, the data input to the comparator is at the opposite logic state as the R1 input to the comparator at the beginning of the cycle. The comparator output DET does not change state until the data input goes to the same state as the R1 input, as shown at 42. The DET output then transitions to the opposite state of R1.

As illustrated in the third cycle shown in FIG. 2, designated 44, the data input is already at the same logic level as the R1 input to the comparator at the beginning of the cycle, and the DET output switches as soon as R1 switches, as shown at 46. The data pulse transitions during cycle 44 have no affect on the DET output. Even if there were no data pulse transitions during cycle 44, the DET output would change states at the beginning of the cycle because the data and R1 inputs have the same state. Since the data and R1 inputs have existed in the same state at some time during the cycle, the DET output has changed states and there is no error indication.

Comparator 24 thus latches its output 22 to the changed logic state upon its first transition thereto during a cycle, regardless of subsequent logic state changes in data input 26 during the remainder of the cycle, whereby to provide alternate opposite flip-flop output states R1 for successive cycles.

Figure 4:
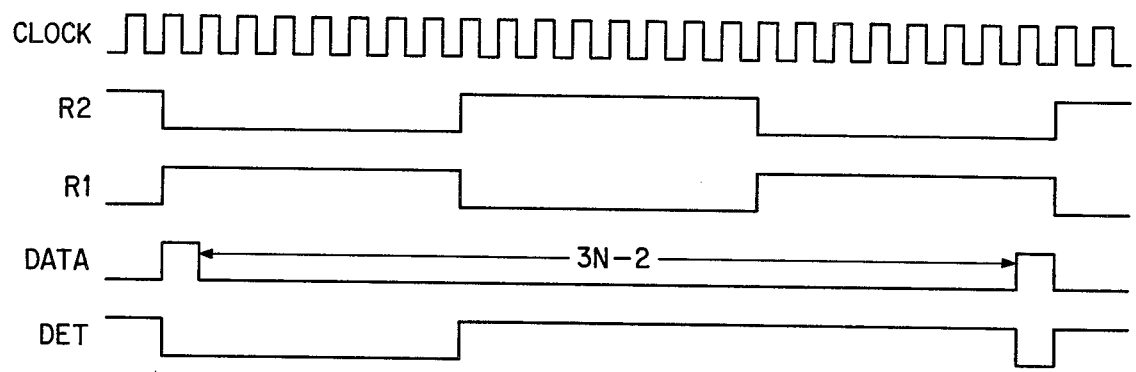
FIG. 4 illustrates a timing alignment with a sequence of $3N-2$ consecutive identical logic state data bits, to show operation of the circuit of FIG. 1 for the maximum allowable number of consecutive unchanged data bits without causing an error indication.
Figure 5:
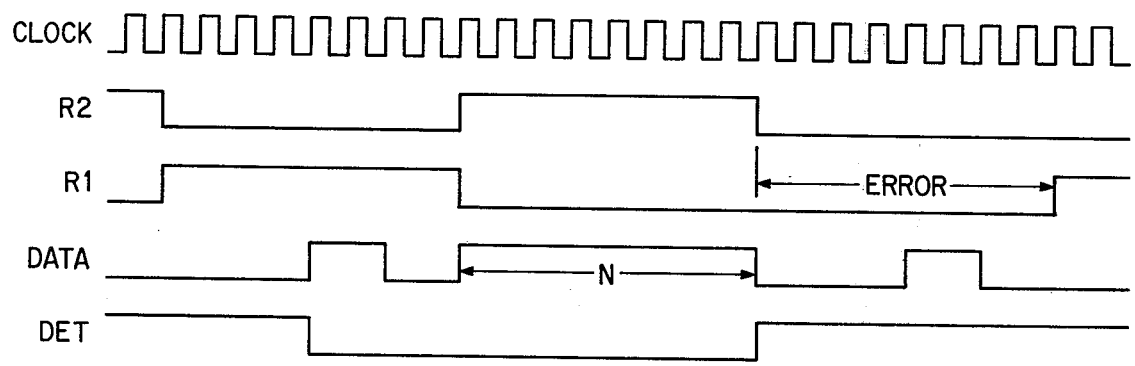
FIG. 5 illustrates a timing alignment with a sequence of N consecutive identical logic state data bits, to show operation of the circuit of FIG. 1 for the minimum number of consecutive unchanged data bits causing an error indication.

The number of consecutive unchanged data bits detected as an error depends upon how such bits align with the R1 signal on comparator input 28. The number of consecutive unchanged data bits required to cause an error indication can be as low as N or as high as $3N-1$, depending upon this alignment. FIG. 4 illustrates a timing alignment with a sequence of $3N-2$ consecutive unchanged data bits on input 26 which does not generate an error indication. FIG. 5 illustrates a timing alignment with a sequence of N consecutive unchanging data bits on input 26 which generates an error indication.

A failure within the circuit of FIG. 1 will also cause a two rail violation, i.e. non-complementary outputs R1 and R2. A failure in comparator 24 causes the comparator output signal DET on line 22 to not be in opposite logic states on successive X1 pulses. Thus an error would be indicated, as for real data errors. If divider 14 or flip-flop 18 fail, then the Q output on rail R1 would reach a steady state and the Q output of flip-flop 20 on rail R2 would soon reach that same state, thereby indicating an error. If divider 16 or flip-flop 20 fail, then the Q output of flip-flop 18 continues to toggle predictably and R1 and R2 would periodically be in non-complementary states, thereby indicating an error.

The invention thus provides an error detector circuit for detecting prolonged sequences of one logic state on a data bus without intervening bits of opposite logic state. The particular system application determines the length of such sequence in terms of time, or in terms of number of bits. Once this error threshold period is specified, N is chosen accordingly such that $3N-1$ is less than or equal to such specified period. N is chosen according to the particular divider means implemented. An alternative to the divider means is an external strobe input to delimit cycles. This strobe input would clock the circuit and have a rate chosen such that the data bus logic state must change at least once in a certain length of time in order to avoid an error indication. Clock 12 in FIG. 1 thus may be the data clock signals from the data bus or an independent timing circuit. The latter enables elimination of the divider means. Both alternatives provide the requisite timing means outputting periodic signals defining cycles.

In the embodiment of FIG. 1, divider means implemented by divider 14 outputs a signal every Nth data time slot of the bus to define a cycle. Switch means implemented by flip-flop 18 is clocked by the signal X1 from the divider means for gating an input (D) of the switch means to an output (Q) of the switch means. Comparator means 24 compares the logic state of data on the bus to the logic state of the switch means output during a cycle. In response to a given logic state of data on the bus relative to the logic state of the switch means output during the cycle, the comparator means changes the logic state of the switch means input such that the switch means output switches to the opposite logic state at the next successive signal X1 from the divider means. The switch means thus has alternate opposite logic states for successive cycles as long as data on the bus exists for a time at the given logic state relative to the logic state of the switch means output during each cycle. In the implementation in FIG. 1, the noted given logic state of the data input detected by the comparator is the logic level which is the same as that existing on the R1 input 28. Different implementations of the comparator can of course alternatively detect an opposite logic level as the given logic state of the data bus relative to the logic state of the switch means output R1.

The error detector circuit generates a two rail logic output which is complementary in the absence of an error and which changes every Nth bit to actively exercise the circuit and prevent silent failures. Comparator means 24 compares the logic state of its first and second inputs 26 and 28 and changes its output 22 to alternate opposite logic states for successive cycles in which its first input 26 exists in given alternate logic states relative to the alternate opposite logic states of its second input 28 as clocked through flip-flop 18. This cycling of output 22 between opposite logic states actively changes the output states of R1 and R2 at each cycle. An error on the data bus disrupts this cyclic activity such that output 22 of the comparator means stays at the same logic state which is clocked through flip-flop 18 at the next X1 signal from divider 14. Rails R1 and R2 become non-complementary, indicating an error. The detector circuit is thus not dormant, but rather is actively and cyclicly exercised to guard against silent failures.

It is recognized that various modifications are possible within the scope of the appended claims.

What is claimed is:

1. An error detector circuit for detecting a prolonged sequence of identical state bits on a data bus without intervening bits of opposite state, comprising:

timing means outputting periodic signals defining cycles;

switch means clocked by said signal for gating an input of said switch means to an output of said switch means; and comparator means comparing the logic state of data on said bus to the logic state of said output of said switch means during a cycle and, in response to a given logic state of data on said bus relative to the logic state of said output of said switch means during the cycle, changing the logic state of said input of said switch means such that said output of said switch means switches to opposite state at the next successive said signal whereby said switch means has alternate opposite logic states for successive cycles as long as data on said bus exists for a time at said given logic state relative to the logic state of said output of said switch means during each cycle.

2. The invention according to claim 1 wherein said switch means comprises flip-flop means clocked by said signal.

3. The invention according to claim 2 wherein said comparator means has a first input from said data bus and a second input from an output of said flip-flop means, and has an output changing logic states when said first input exists in said given logic state relative to said second input, said output of said comparator means being connected to an input to said flip-flop means such that said output of said flip-flop means changes logic state at each said cycle if said data bus exists for a time in said given logic state relative to said second input during each cycle.

4. The invention according to claim 3 wherein said comparator means latches its output to the changed logic state upon its first transition thereto during a cycle, regardless of subsequent logic state changes in said first input during the remainder of the cycle, whereby to provide alternate opposite flip-flop output states for successive cycles.

5. The invention according to claim 1 wherein said timing means comprises divider means outputting a signal every Nth data time slot of said bus to define a cycle.

6. An error detector circuit for detecting more than a predetermined maximum allowable number of consecutive bits of identical logic state on a data bus without intervening bits of opposite logic state, comprising:

divider means outputting a signal every Nth data time slot of said bus to define a cycle;

flip-flop means clocked by said signal from said divider means;

comparator means having a first input from said data bus and a second input from an output of said flip-flop means, and having an output changing logic states when said first input exists in a given logic state relative to said second input, said output of said comparator means being connected to an input to said flip-flop means such that said output of said flip-flop means changes logic states at each said cycle if said data bus exists for a time in said given logic state relative to said second input during each cycle, said comparator means latching its output to the changed logic state upon its first transition thereto during a cycle, regardless of subsequent logic state changes in said first input during the remainder of the cycle, whereby to provide alternate opposite flip-flop output states for successive cycles.

7. The invention according to claim 6 wherein said output of said comparator means changes to a logic state opposite said second input of said comparator means when said first input of said comparator means exists in a logic state identical to said second input of said comparator means.

8. An error detector circuit for detecting a prolonged sequence of identical logic state bits on a data bus without intervening bits of opposite logic state, and generating a two rail logic output which is complementary in the absence of an error, comprising:

timing means outputting periodic signals defining cycles;

a pair of flip-flops clocked by said signals, one flip-flop having an output connected to an input of the other flip-flop and also providing one rail R1, said other flip-flop having an output providing the other rail R2;

comparator means having a first input from said data bus and a second input from said output of said one flip-flop, and having an output to an input of said one flip-flop, said comparator means comparing the logic state of its first and second inputs and changing its output to alternate opposite logic states for successive cycles in which the logic state of its said first input has existed for a time in a given logic state relative to the alternate opposite logic states of its said second input as clocked through said one flip-flop, whereby a prolonged sequence of identical logic state data bits on said bus present a logic state at said first input of said comparator means which has not existed for a time during a cycle in said given logic state relative to said output of said one flip-flop at said second input of said comparator means such that said output of said comparator means stays at the same logic state which is clocked through said one flip-flop at the next said signal whereby said rails R1 and R2 become non-complementary, indicating an error.

9. The invention according to claim 8 wherein a failure within said circuit also causes non-complementary outputs on said rails R1 and R2 such that an error presented to said circuit or occurring within said circuit is indicated at said two rail output.

10. The invention according to claim 8 wherein said comparator means comprises:
a pair of parallel gates each connected to said data bus and to said output of said one flip-flop; and
a pair of cross-connected output gates each receiving the output of the other and the output of a respective one of said input gates to provide an output which is latched to a changed opposite logic state regardless of subsequent bit transitions on said bus during a cycle period.

11. The invention according to claim 10 wherein:
said input gates comprise an OR gate and a NAND gate;
said output gates comprise NAND gates; and
said output of said comparator means is provided by the output NAND gate which is input from said OR gate, such that said output of said comparator means switches to opposite logic state if its said first input exists in said given logic state relative to its said second input.

12. An error detector circuit for detecting more than a predetermined maximum allowable number of consecutive bits of identical logic state on a data bus without intervening bits of opposite logic state, and generating a two rail logic output which is complementary in the absence of an error and which changes every Nth bit to actively excercise said circuit and prevent silent failures, comprising:
divider means outputting signals every Nth data time slot of said bus to define a cycle;
a pair of flip-flops clocked by said signals from said divider means, one flip-flop having an output connected to an input of the other flip-flop and also providing one rail R1, said other flip-flop having an output providing the other rail R2; and
comparator means having a first input from said data bus and a second input from said output of said one flip-flop, and having an output to an input of said one flip-flop, said comparator means comparing the logic state of its said first and second inputs and changing its output to alternate opposite logic states for successive cycles in which the logic state of its said first input has existed for a time in a given logic state relative to the alternate opposite logic states of its said second input as clocked through said one flip-flop, whereby a prolonged sequence of consecutive identical logic state data bits on said bus greater than said predetermined maximum allowable number present a logic state at said first input of said comparator means which has not existed in said given logic state relative to said output of said one flip-flop at said second input of said comparator means such that said output of said comparator means stays at the same logic state which is clocked through said one flip-flop at the next said signal from said divider means whereby said rails R1 and R2 become non-complementary, indicating an error.

13. The invention according to claim 12 wherein a failure within said circuit also causes non-complementary outputs on said rails R1 and R2 such that an error presented to said circuit or occuring within said circuit is indicated at said two rail output.

14. The invention according to claim 13 wherein said divider means comprises a pair of divide by N dividers each outputting a signal to a respective one of said pair of flip-flops.

15. The invention according to claim 12 wherein said predetermined maximum allowable number is $3N-2$.

16. The invention according to claim 15 wherein the minimum number of consecutive bits of identical logic state on said data bus detected by said circuit to generate an error indication is N.

17. The invention according to claim 12 wherein said comparator means comprises:
a pair of parallel input gates each connected to said data bus and to said output of said one flip-flop; and
a pair of cross-connected output gates each receiving the output of the other and the output of a respective one of said input gates to provide an output which is latched to a changed opposite logic state regardless of subsequent bit transitions on said bus during a cycle.

18. The invention according to claim 17 wherein:
said input gates comprise an OR gate and a NAND gate;
said output gates comprise NAND gates; and
said output of said comparator means is provided by the output NAND gate which is input from said OR gate, such that said output of said comparator means switches to opposite logic state if its said first input goes to the same logic state as its said second input.

19. The invention according to claim 18 wherein said flip-flops comprise type D flip-flops, the Q outputs of which provide said rails R1 and R2, the Q output of said one flip-flop also being connected to the D input of said other flip-flop and to said input OR and NAND gates, said one mentioned output NAND gate being connected to the D input of said one flip-flop, said output of said comparator means switching to a logic state opposite its said second input if its said first input goes to the same logic state as its said second input.

* * * * *